(12) United States Patent
Smith et al.

(10) Patent No.: US 9,307,380 B1
(45) Date of Patent: Apr. 5, 2016

(54) SYSTEM AND METHOD FOR UNIFIED SYNCHRONIZATION OF RELATIONSHIP CONNECTIONS ACROSS MULTIPLE SOCIAL NETWORK DATABASES

(71) Applicant: DGS Development, LLC, Salt Lake City, UT (US)

(72) Inventors: Sean Smith, Salt Lake City, UT (US); Madison Smith, Salt Lake City, UT (US)

(73) Assignee: DGS Development, LLC, Salt Lake City, UT (US)

( * ) Notice: Subject to any disclaimer, the term of this patent is extended or adjusted under 35 U.S.C. 154(b) by 0 days.

(21) Appl. No.: 14/841,587

(22) Filed: Aug. 31, 2015

Related U.S. Application Data

(63) Continuation of application No. 14/817,076, filed on Aug. 3, 2015.

(51) Int. Cl.
| | |
|---|---|
| *G06F 15/16* | (2006.01) |
| *H04W 4/20* | (2009.01) |
| *H04W 4/02* | (2009.01) |
| *H04L 12/58* | (2006.01) |
| *H04W 4/00* | (2009.01) |

(52) U.S. Cl.
CPC ............. *H04W 4/206* (2013.01); *H04L 51/32* (2013.01); *H04W 4/008* (2013.01); *H04W 4/023* (2013.01)

(58) Field of Classification Search
CPC ..... G06Q 50/01; H04W 4/206; H04W 4/008; H04W 4/023; H04L 51/21
See application file for complete search history.

(56) References Cited

U.S. PATENT DOCUMENTS

| | | | |
|---|---|---|---|
| 8,700,710 B1 | 4/2014 | Gallagher et al. | |
| 8,738,714 B2 | 5/2014 | Setton | |
| 8,761,744 B2 | 6/2014 | Celik et al. | |
| 2008/0292080 A1 | 11/2008 | Quon et al. | |
| 2009/0215469 A1 | 8/2009 | Fisher et al. | |
| 2011/0244894 A1 | 10/2011 | Mahalingam | |
| 2011/0319058 A1 | 12/2011 | Ankolekar et al. | |
| 2013/0103758 A1* | 4/2013 | Alison | G06Q 50/01 709/204 |
| 2013/0179802 A1* | 7/2013 | Martinazzi | H04L 67/22 715/753 |
| 2013/0185355 A1* | 7/2013 | Tseng | H04L 65/403 709/204 |
| 2013/0238697 A1 | 9/2013 | Mehta et al. | |

(Continued)

OTHER PUBLICATIONS

Rachel Metz, To Find Friends, Start at iPhone, Turn Left at Glass, Jan. 30, 2014, MIT Technology Review, pp. 1-3.*

(Continued)

*Primary Examiner* — Jonathan Bui
(74) *Attorney, Agent, or Firm* — Knobbe Martens Olson & Bear LLP

(57) ABSTRACT

A system and method for unified synchronization of relationship connections across multiple social network databases is disclosed. In one aspect, the method includes logging in a first user to a first user account through a first wireless mobile device controlled by the first user, wherein the first user account comprises a logical connection to a plurality of the first user's social network accounts. The method further includes discovering a second wireless mobile device or account associated with a second user. The method further includes selecting more than one of the first user's social network accounts via input from the first user, and generating an invitation to connect to the second user's account, wherein the invitation comprises a connection invitation for the second user to connect to at least one of the selected social network accounts of the first user.

14 Claims, 6 Drawing Sheets

(56) References Cited

U.S. PATENT DOCUMENTS

| | | | |
|---|---|---|---|
| 2013/0304830 A1 | 11/2013 | Olsen et al. | |
| 2013/0316735 A1* | 11/2013 | Li | H04W 4/02 455/456.3 |
| 2014/0012918 A1* | 1/2014 | Chin | G06Q 50/01 709/204 |
| 2014/0156746 A1* | 6/2014 | Wheatley | H04L 67/22 709/204 |
| 2015/0242967 A1* | 8/2015 | Shsh | G06Q 10/105 705/319 |

OTHER PUBLICATIONS

Jenna Wortham, "New Apps Connect to Friends Nearby", Mar. 8, 2012, The New York Times, pp. 1-5.*

'Hootsuite App,' Hootsuite, version varies with device, updated Aug. 5, 2015, Android Apps on Google Play, https://play.google.com/store/apps/details?id=com.hootsuite.droid.full, 5 pages, printed Aug. 31, 2015.

"GrabInBox is an easy way to manage multiple twitter, facebook, fan pages and linkedin accounts," http://www.grabinbox.com/, 4 pages, printed Aug. 20, 2015.

'Socialpro App,' Social Pro, version 1.19, updated Dec. 15, 2014, Mac App Store, https://itunes.apple.com/us/app/social-pro-for-facebook-twitter/id433364821?mt=12, 2 pages, printed Aug. 20, 2015.

"Swayy: Content Sharing Made Easy," Mark Myerson, Apr. 22, 2013, http://web.appstorm.net/reviews/social-networking/swayy-content-sharing-made-easy/, 6 pages, printed Aug. 20, 2015.

'Buffer App,' Buffer, version varies with device, updated Aug. 19, 2015, Android Apps on Google Play, https://play.google.com/store/apps/details?id=org.buffer.android, 3 pages, printed Aug. 20, 2015.

'Socialite App,' Socialite, version 1.5.16, updated Dec. 18, 2014, Android Apps on Google Play, https://play.google.com/store/apps/details?id=com.getsocialite.socialiteapp, 4 pages, printed Aug. 31, 2015.

"Holonis is about businesses and consumers communicating and being connected through content, social media, commerce and data," https://www.holonis.com/, 3 pages, printed Aug. 20, 2015.

"FriendFeed: The official Blog of FriendFeed," http://blog.friendfeed.com/, 4 pages, printed Aug. 31, 2015.

'Allsync App,' AllSync, version 3.5.2, updated Nov. 14, 2014, App Store on iTunes, https://itunes.apple.com/us/app/allsync-sync-import-your-contacts/id412811804?mt=8, 16 pages, printed Aug. 20, 2015.

'Sproutsocial App,' Sproutsocial, version 3.4, updated Aug. 12, 2015, Android Apps on Google Play, https://play.google.com/store/apps/details?id=com.sproutsocial.android, 4 pages, printed Aug. 31, 2015.

"Vallo: Update Your Facebook, Twitter and LinkedIn Accounts Simultaneously," http://www.vallo-app.com/, 5 pages, printed Aug. 20, 2015.

'TweetDeck App,' TweetDeck, version 3.9.889, updated Jul. 14, 2015, Mac App Store, https://itunes.apple.com/gb/app/tweetdeck-by-twitter/id485812721?mt=12, 2 pages, printed Aug. 20, 2015.

'Crowdfire, formerly JustUnfollow App,' Crowdfire, version varies with device, updated Apr. 3, 2015, Android Apps on Google Play, https://play.google.com/store/apps/details?id=com.justunfollow.android, 13 pages, printed Aug. 20, 2015.

'Bindr, formerly Cubenect App,' Bindr, version 2.0.3, updated May 1, 2015, App Store on iTunes, https://itunes.apple.com/us/app/bindr-simple-social-management/id603377849?mt=8, 10 pages, printed Aug. 20, 2015.

'IF by IFTTT App' IF, version 1.4.5, updated Aug. 11, 2015, Android Apps on Google Play, https://play.google.com/store/apps/details?id=com.ifttt.ifttt, 5 pages, printed Aug. 31, 2015.

* cited by examiner

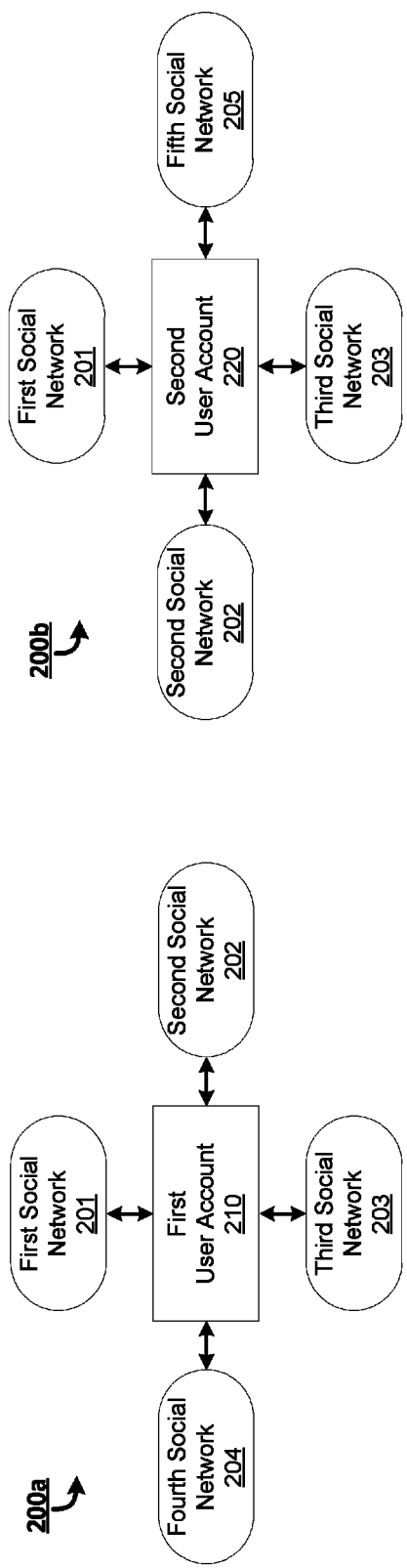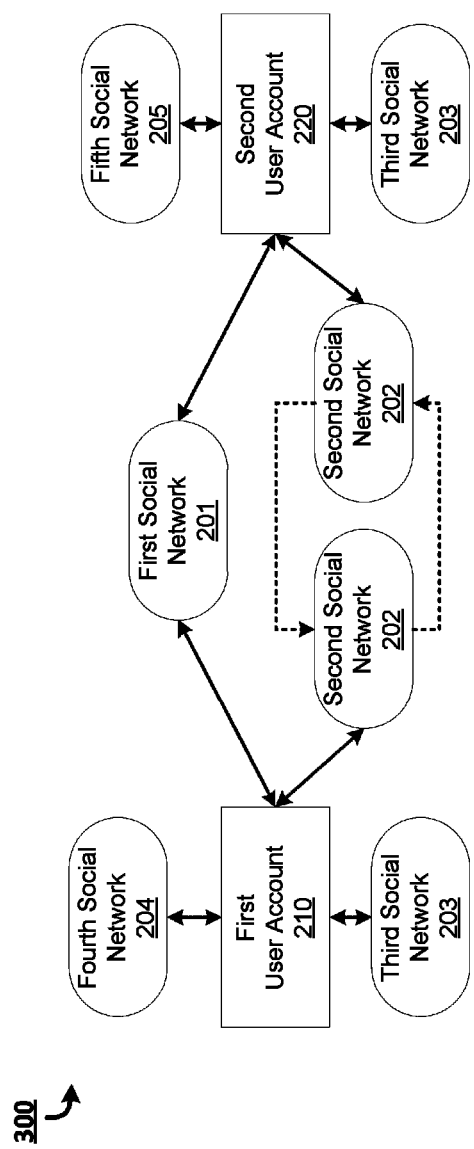

SYSTEM AND METHOD FOR UNIFIED SYNCHRONIZATION OF RELATIONSHIP CONNECTIONS ACROSS MULTIPLE SOCIAL NETWORK DATABASES

CROSS-REFERENCE TO RELATED APPLICATION(S)

This Application is a Continuation of and claims benefit from U.S. application Ser. No. 14/817,076, filed on Aug. 3, 2015 entitled "SYSTEM AND METHOD FOR UNIFIED SYNCHRONIZATION OF RELATIONSHIP CONNECTIONS ACROSS MULTIPLE SOCIAL NETWORK DATABASES," which is incorporated herein by reference in its entirety.

FIELD

1. Field of the Technology

The invention generally relates to social networks, and more particularly, to systems and methods for unified synchronization of relationship connections across multiple social network databases.

2. Related Technology

Several known social networks are available for sharing of content (e.g., text-based messages, images, audio, video, other computer files, access to money, etc.), generally through the Internet. Current social networks include social media networks, such as Facebook, Twitter, LinkedIn, Pinterest, Google Plus, Instagram, and VK. A user of one of these social networks can connect with friends, family members, acquaintances, businesses, etc. through initiating a friend request, a follow request, or some other request, depending on the configuration of the social network. Computing devices, whether wired or wireless, access these social networks through the use of Internet browsers or dedicated software applications, also called apps.

In current implementations, a user must log in to their account for each social network to initiate a relationship connection to another user. If the user desires to add another user's contact information (e.g., phone number, home address, email, website URL, notes, etc.) to the user's device, this involves additional steps. This process can be tedious because each time the first user wishes to connect with another user, the first user must access each of their associated social networks individually, find the other user's account, and initiate a connection (e.g., friend or follow) request. Thus, methods and apparatuses for connecting users to more than one social network at a time may be desired.

SUMMARY OF CERTAIN INVENTIVE ASPECTS

Various implementations of systems, methods and devices within the scope of the appended claims each have several aspects, no single one of which is solely responsible for the desirable attributes described herein. Without limiting the scope of the appended claims, some prominent features are described herein.

One inventive aspect is a method for unified synchronization of relationship connections across a plurality of social networks. The method includes logging in a first user to a first user account through a first wireless mobile device controlled by the first user, wherein the first user account comprises a logical connection to a plurality of the first user's social network accounts. The method further includes discovering a second wireless mobile device controlled by a second user, wherein a second user account is associated with the second user. The method further includes selecting more than one of the first user's social network accounts via input from the first user to the first wireless mobile device. The method further includes, upon input from the first user to the first wireless mobile device, generating an invitation to connect to the second user's account, wherein the invitation comprises a connection invitation for the second user to connect to at least one of the selected social network accounts of the first user.

Another inventive aspect is a first mobile wireless device for unified synchronization of relationship connections across a plurality of social networks. The first wireless mobile device includes a processor configured to log in a first user to a first user account, wherein the first user account comprises a logical connection to a plurality of the first user's social network accounts. The processor is further configured to discover a second wireless mobile device controlled by a second user, wherein a second user account is associated with the second user. The first wireless mobile device further includes a user interface configured to receive a selection of more than one of the first user's social network accounts. The processor is further configured to generate an invitation to connect to the second user's account upon receiving the selection, wherein the invitation comprises a connection invitation for the second user to connect to at least one of the selected social network accounts of the first user.

Another inventive aspect is a non-transitory computer readable medium. The medium includes code that, when executed, performs a method for unified synchronization of relationship connections across a plurality of social networks. The executed method includes logging in a first user to a first user account through a first wireless mobile device controlled by the first user, wherein the first user account comprises a logical connection to a plurality of the first user's social network accounts. The executed method further includes discovering a second wireless mobile device controlled by a second user, wherein a second user account is associated with the second user. The executed method further includes selecting more than one of the first user's social network accounts via input from the first user to the first wireless mobile device. The executed method further includes upon input from the first user to the first wireless mobile device, generating an invitation to connect to the second user's account, wherein the invitation comprises a connection invitation for the second user to connect to at least one of the selected social network accounts of the first user.

Details of one or more implementations of the subject matter described in this specification are set forth in the accompanying drawings and the description below. Other features, aspects, and advantages will become apparent from the description, the drawings, and the claims. The relative dimensions of the following figures may not be drawn to scale.

FIG. 2A illustrates a connection matrix 200a of a first user account 210, according to an embodiment.

FIG. 2B illustrates a connection matrix 200b of a second user account 220, according to an embodiment.

FIG. 3 illustrates a connection matrix 300 of the first user account of FIG. 2A and the second user account 220 of FIG. 2B after a connection process, according to an embodiment.

DETAILED DESCRIPTION OF CERTAIN
ILLUSTRATIVE EMBODIMENTS

Various embodiments of the novel systems, apparatuses, and methods are described more fully hereinafter with reference to the accompanying drawings. The teachings of this disclosure can, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the novel systems, apparatuses, and methods disclosed herein, whether implemented independently of or combined with any other embodiment of the invention. For example, an apparatus can be implemented or a method can be practiced using any number of the embodiments set forth herein. In addition, the scope of the invention is intended to cover such an apparatus or method which is practiced using other structure, functionality, or structure and functionality in addition to or other than the various embodiments of the invention set forth herein. It should be understood that any embodiment disclosed herein can be embodied by one or more elements of a claim.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses, or objectives. Rather, embodiments of the disclosure are intended to be broadly applicable to different wireless technologies, system configurations, networks, and transmission protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

Figure 1:
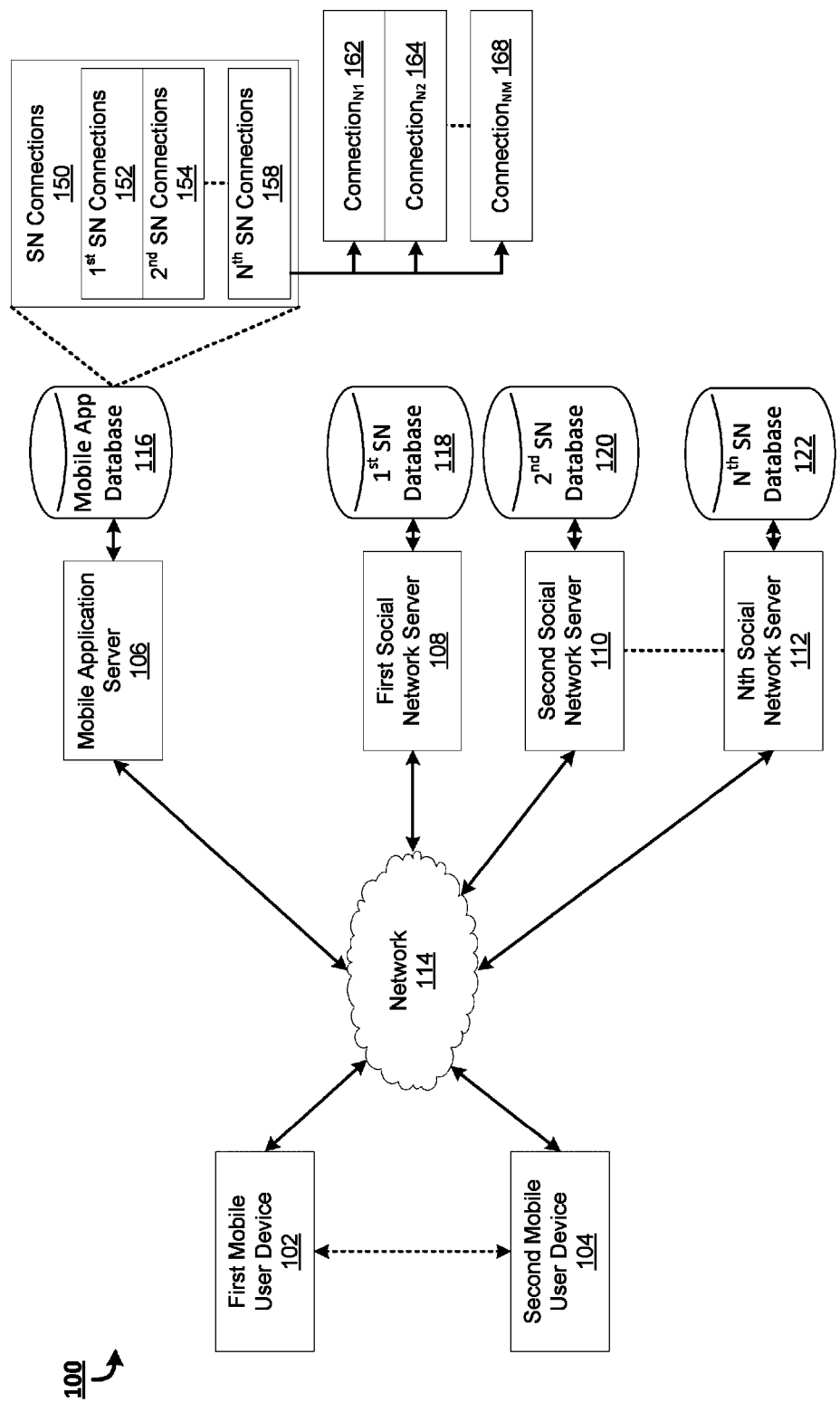
FIG. 1 illustrates an example of a computing environment in which multiple social networks are deployed.

FIG. 1 illustrates an example of a computing environment in which multiple social networks are deployed. As illustrated, the network environment 100 can include a first mobile user device 102, a second mobile user device 104, a mobile application server 106, a first social network server 108, and a second social network server 110 through an $N^{th}$ social network server 112. Each of these entities can be connected through a wired or wireless connection to a network 114. In some embodiments, the network 114 can include a wide area network (WAN) connection, such as the Internet.

In some embodiments, the first mobile user device 102 or the second mobile device 104 can include one or more of a processor, a memory, a transmitter, a receiver, a display, and a user interface. In various embodiments, the processor can be configured to execute code, such as software, in order to perform the various functions described herein. In some embodiments, the code can be stored on the memory. In some embodiments, the transmitter can be transmit data or other signals to other devices, such as another mobile device (e.g., the first mobile user device 102 or the second mobile user device 104), the mobile application server 106, or one or more of the first through the $N^{th}$ social network servers 108-112. In some embodiments, the receiver can be configured to receive data or other signals from other devices, such as another mobile device (e.g., the first mobile user device 102 or the second mobile user device 104), the mobile application server 106, or one or more of the first through the $N^{th}$ social network servers 108-112. In one embodiment, the transmitter and the receiver can be implemented as a transceiver. In some embodiments, the display can be configured to display information to a user of the device (e.g., the first mobile user device 102 or the second mobile user device 104). In one embodiment, the display can be implemented as a touchscreen display. In various embodiments, the user interface can include a keypad, a microphone, a speaker, a display, or any element or component that conveys information to a user of the device or received input from the user thereof.

As illustrated, in one embodiment, the first mobile user device 102 can additionally or alternatively connect to the second mobile user device 104 outside of the network 114. In accordance with this embodiment, this connection can occur via a near field communication (NFC) or Bluetooth protocol, such as Bluetooth LE.

In some embodiments, the mobile application server 106 can be configured to host or otherwise run a social network (referred to herein as the "social connection network" or "SCN"). In various embodiments, the SCN can include user accounts which can be utilized to connect users on more than one separate social network at a time. In some embodiments, "separate" social networks can refer to social networks that are separate from the SCN and separate from each other. In some embodiments, the more than one social networks can include "social media networks" such as Facebook, Twitter, LinkedIn, Pinterest, Google Plus, Instagram, or VK. In some embodiments, the more than one social networks can further include other networks, which cannot be traditionally considered "social" or "social media" networks, but otherwise include user accounts. For example, some networks or websites can provide a platform for sharing product reviews or other media, and can require users to register for a user account with the platform in order to share a product review (e.g., Yelp, Amazon, or Expedia), post a comment (e.g., YouTube or Reddit), or otherwise edit content (e.g., Wikipedia). The platform itself can or cannot provide a method of connecting the various user accounts within the platform. In either event, users of the platform can wish to connect with other users (e.g., one user can wish to read a product or service review written by one of their friends), and therefore, the more than one social networks can include one or more of these networks, websites, or platforms.

In some embodiments, a first user of the SCN can link each of their separate social network accounts (e.g., one or more of the user's Facebook, Twitter, LinkedIn, Pinterest, Google Plus, Instagram, and VK accounts) to their first user account within the SCN. In accordance with these embodiments, the first user can be able to connect with a second user through a connection process, who has similarly linked each of their separate social network accounts to their second user account within the SCN. In some embodiments the SCN accounts of the first or second user can be regarded as comprising a logical connection (referred to herein as "linked") to a plurality of the first or second users' social network accounts, respectively. During this connection process, each of the first and second users can select any number of their linked social network accounts to share with each other. In some embodiments, the first and second users can additionally or alternatively select any number of the other user's social network accounts that they wish to follow through a selection process. As a result of the selection process, the first and second users can become connected through each of the social network accounts they selected. For example, as a result of the selection process, the first and second user can become "friends" on Facebook and Google Plus, and can also become "follower" of each other on Instagram and Pinterest. As mentioned above, social networks can be considered either "share" or "follow" networks. For example, Facebook, LinkedIn, and Google Plus can be considered friend networks because both users must accept a connection because both user accounts have equal permissions with respect to each other (e.g., either user can post comments on the account of the other user). By way of another example, Twitter, Instagram, and Tumblr can be considered follow networks because only one user can be required to form a connection between themselves and another user, because the connected users cannot have equal permissions (e.g., one user can only be allowed to view the account of another user), or because two separate connections can be necessary (e.g., the first user account must initiate a connection to follow the second user account and a separate connection must be initiated by the second user account to follow the first user account). In some embodiments, a connection can only occur where both users select the same social network to share or follow. The use of "first," "second," and other numerical values are merely illustrative, as an unlimited number of users can be able to utilize the described SCN.

As illustrated, the mobile application server 106 can be connected to, or otherwise include, a mobile application database 116. In some embodiments, the mobile application database 116 can contain the information necessary to run the SCN. For example, as illustrated, the mobile application database 116 can include a plurality of social network connections 150. The social network connections 150 can include first social network connections 152 and second social network connections 154 through $N^{th}$ social network connections 158. Each of the first through $N^{th}$ social network connections 152-158 can include preexisting connections between users on each of the respective social networks. For example, as illustrated, the $N^{th}$ social network connections 158 can include connection$_{N1}$ 162 and connection$_{N2}$ 164 through connection$_{NM}$ 168. Each of these connections$_{N1-M}$ 162-168 can include a connection from one user account within the $N^{th}$ social network to another user account within the $N^{th}$ social network. For example, in one embodiment, connection$_{N1}$ 162 can include an indication that the first user's Facebook account and the second user's Facebook account are "friends," wherein Facebook is the $N^{th}$ social network. By way of another example, in one embodiment, connection$_{N1}$ 162 can include an indication that the first user's Instagram account is "following" the second user's Instagram account, wherein Instagram is the $N^{th}$ social network. Accordingly, the social network connections 150 can include all connections (e.g., indications of friendships or followings) among the users of each social network. In some embodiments, the social network connections 150 can only include the social network connections for the users of SCN (e.g., users who have registered for an account with the SCN and linked their separate social network accounts). In various embodiments, the social network connections 150 can be updated in a number of ways, such as periodically, when a user of the SCN first registers, when a user of the SCN links a new separate social network account, when a user of the SCN adds a new connection within the SCN, when a user of the SCN adds a new connection within one of the separate social networks, when a user of the SCN views the account information of another user of the SCN, or when a user of the SCN initiates the connection process with another user of the SCN (e.g., the SNC connection process 500 of FIG. 5 below).

In some aspects, when a first user of the SCN registers for an account, the first user may automatically be connected to a second user of the SCN, based at least in part upon whether the first user and the second user have any preexisting connections on their social network accounts. For example, if a first user and a second user are Facebook friends, and the first and second user have linked their Facebook accounts to their SCN accounts, the first and second user may become connected within the SCN (e.g., "friends"), without any additional steps (e.g., without initiating a friend, follow, or some other request).

As further illustrated, the first social network server 108 can be connected to, or otherwise include, a first social network database 118, the second social network server 110 can be connected to, or otherwise include, a second social network database 120, and the $N^{th}$ social network server 112 can be connected to, or otherwise include, an $N^{th}$ social network database 122. Each of the social network databases 118-122 can contain information relating to each of the users of the respective social network. For example, each of the social network databases 118-122 can contain account information for each of the users of the respective social network, and can contain indications of all of the connections that each of the users have to other users of the same social network. In some embodiments, the information on the connections of each separate social network stored in the databases can be used to populate the social network connections 150.

FIG. 2A illustrates a connection matrix 200a of a first user account 210, according to an embodiment. In some embodiments, the first user account 210 can be an account for a first user of the SCN. In accordance with these embodiments, the first user can link each of their separate social network accounts to the first user account 210. For example, as illustrated, the first user account 210 can be linked to a first social network 201, a second social network 202, a third social network 203, and a fourth social network 204. In some embodiments, the first user can link the first user account 210 to each of these networks (e.g., link the first user account 210 to each of the first user's separate social network accounts on the first through the fourth social networks 201-204) during a registration process on the SCN, or at a later time when the first users chooses to link a separate social network account.

FIG. 2B illustrates a connection matrix 200b of a second user account 220, according to an embodiment. In some embodiments, the second user account 220 can be an account for a second user of the SCN. In accordance with these embodiments, the second user can link each of their separate social network accounts to the second user account 210, as described herein. For example, as illustrated, the second user account 210 can be linked to the first social network 201, the second social network 202, the third social network 203, and a fifth social network 205. In one embodiment, the second user account 220 and the first user account 210 of FIG. 2A cannot be connected on any of the social networks 201-205. In accordance with this embodiment, the first and second user can wish to connect their social network accounts on more than one of the social networks 201-205 at one time. For example, the first user and second user can meet in person and decide that they would like to connect (e.g., become friends or follow one another) on one or more of the social networks 201-205, and can conduct a connection process described herein. After completing the connection process, the first user account 210 and the second user account 220 can be connected on one or more of the social networks 201-205, as illustrated in FIG. 3.

Specifically, FIG. 3 illustrates a connection matrix 300 of the first user account of FIG. 2A and the second user account 220 of FIG. 2B after a connection process, according to an embodiment. For example, as illustrated, the first user account 210 and the second user account 220 can be connected via the first social network 201 after the connection process. In some embodiments, the first social network 201 can be a "friend" network, and the first and second users can be "friends" within the first social network 201. For example, in one embodiment, the first social network 201 can be Facebook. In accordance with this embodiment, the first user corresponding to the first user account 210 and the second user corresponding to the second user account 220 can each have a separate Facebook account within the first social network 201. Therefore, in accordance with this embodiment, after the completion of the connection process, the first user's Facebook account can be connected with the second user's Facebook account. In other words, the first and second users can become friends on Facebook as a result of the connection process.

As illustrated, the first user account 210 and the second user account 220 can also be connected via the second social network 202 after the connection process. In some embodiments, the first social network 202 can be a "follow" network, and the first and second users can "follow" each other within the second social network 202. For example, in one embodiment, the second social network 202 can be Instagram. In accordance with this embodiment, the first user and the second user can each have a separate Instagram account within the second social network 202. Therefore, in accordance with this embodiment, after the completion of the connection process, the first user's Instagram account can be connected with the second user's Instagram account. In other words, the first and second users can individually follow each other on Instagram as a result of the connection process. In some embodiments, only one of the first or second users can follow the other user on Instagram, depending on whether one or both of the first and second users indicated that they wanted to follow the other user during the connection process.

As illustrated, the first user account 210 and the second user account 220 cannot be connected via the third social network 203. In some embodiments, this can occur because one or both of the first and second users did not share or otherwise indicate that the wished to connect with the other user's account within the third social network 203. Also as illustrated, the first user account 210 and the second user account 220 cannot be connected via the fourth social network 204 or the fifth social network 205. This can occur because the first user does not have a separate account, or otherwise did not link their separate account, within the fifth social network 205. The same can be true for the second user and the fourth social network 204. In any event, as illustrated in FIG. 3, the first user (e.g., via the first user account 210) and the second user (e.g., via the second user account 220) can connect on more than one social network 201-205 at a time, wherein the first and second user were not previously connected on any of the social networks 201-205. In other embodiments, the first and second users can have previously been connected on one or more of the social networks 201-205. In some embodiments, the first and second user can also share personal contact information, such as one or more phone numbers, emails, or street addresses during the connection process.

Figure 4:
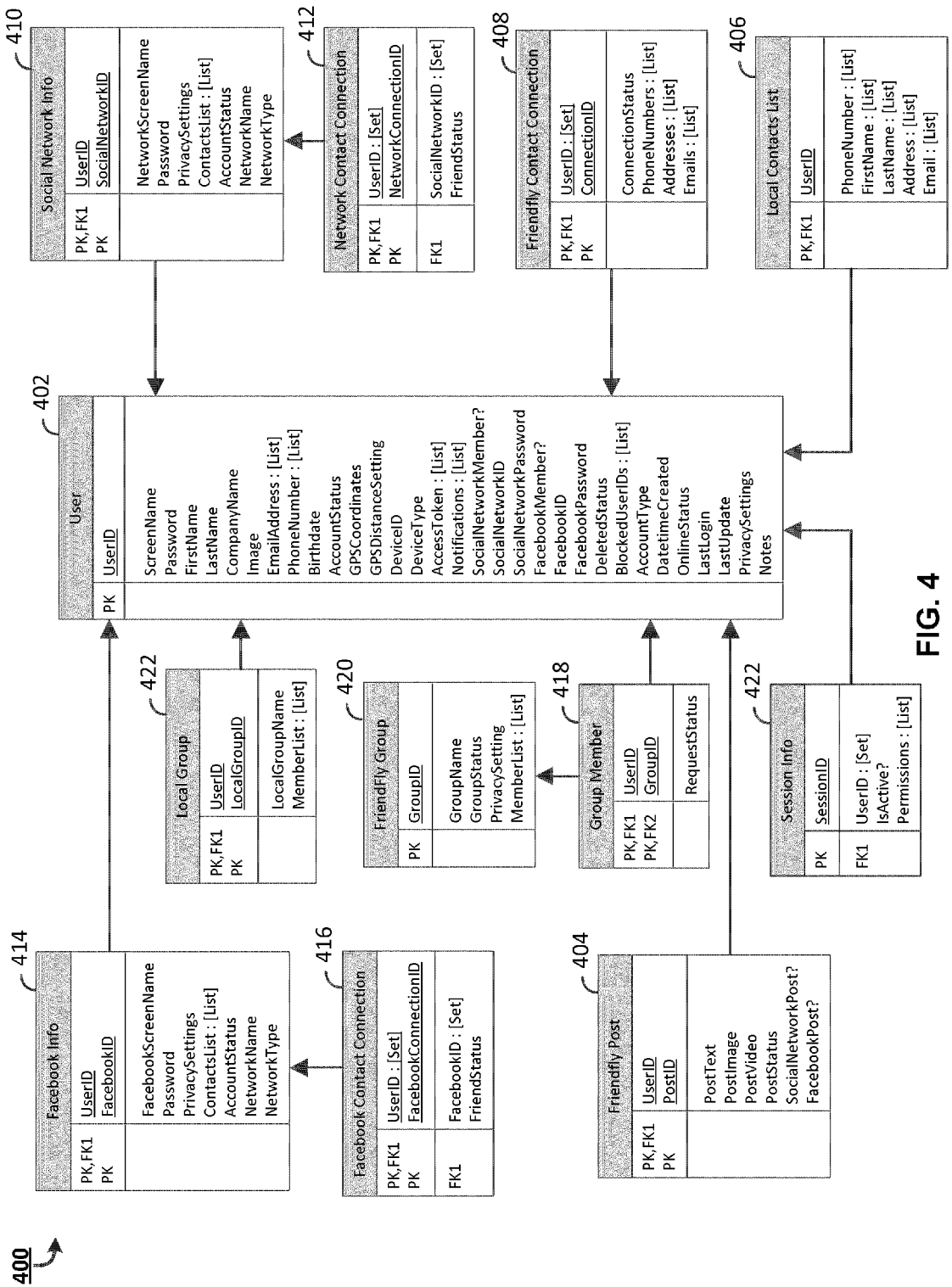
FIG. 4 illustrates an exemplary database for a social connection network (SCN), according to an embodiment.

FIG. 4 illustrates an exemplary database 400 for the SCN, according to an embodiment. In various embodiments, the database 400 can be similar to the mobile application database 116 of FIG. 1. In some embodiments, the database 400 can be utilized to run the SCN, as described herein. As illustrated, the database 400 includes a user entity 402. The user entity 402 can be utilized to uniquely identify a user of the SCN, such as the exemplary first or second users described herein. As illustrated, the user entity 402 can include various fields, including a UserID for a user of the SCN specified by one instance of the user entity 402 (hereinafter "the user"). In one embodiment, the user can be uniquely identified by the UserID. In some embodiments, each instance of the user entity 402 can be referred to as an account for the user. As illustrated, the user entity 402 can further include a ScreenName for the user, a Password for the user, a FirstName of the user, a LastName of the user, and a CompanyName for the user. As illustrated, the user entity 402 can further include an Image for the user such as a URL or file, and a list of EmailAddresses and PhoneNumbers for the user, which can be utilized so that the user can share their personal contact information with another user, or vice versa. The user entity 402 can further include a Birthdate for the user, and an AccountStatus for the user, which can indicate whether the user's account is active.

As illustrated, the user entity 402 can further include GPSCoordinates for the user (e.g., latitude and longitude) and a GPSDistanceSetting for the user, which can indicate whether the user sees other users within a specified distance or whether the user is visible to other users within a specified distance (e.g., 25 ft, 50 ft, 100 ft, etc.). The user entity 402 can further include a DeviceID that uniquely identifies the device used by the user (e.g., a serial number or MAC address) and a DeviceType of the device user by the user (e.g., iPhone). As illustrated, the user entity 402 can further include a list of AccessTokens for the user, which can be utilized when linking or accessing the various separate social network accounts of the user. The user entity 402 can further include a list of Notifications for the user.

In some embodiments, the user entity 402 can indicate whether the user is a member of a specific social network (e.g., one of the social networks 201-205 of FIGS. 2A-B) through the a SocialNetworkMember field, and the user entity 402 can further include a SocialNetworkID for the user on the specified social network, as well as a SocialNetworkPassword of the user on the specified social network. This information can be utilized to log into the user's account on the specified social network in order to obtain additional information about the user, such as any connections the user can have on the specified social network. In various embodiments, this information is replicated for each of social networks supported by the SCN. For example, as illustrated, the user entity 402 can similarly include a FacebookMember indication, a FacebookID of the user, and a FacebookPassword for the user. This information can be similarly used to access the user's Facebook information, including information about each of the user's Facebook friends. In one embodiment, the user entity 402 can further include an ID and password for each of the social networks 201-205 of FIGS. 2A-B.

As illustrated, the user entity 402 can further include a DeletedStatus indicating whether the user's account has been or will be deleted, a list of BlockedUserIDs indicating which users of the SCN the user has blocked, and an AccountType of the user's account (e.g., normal user, administrative user, etc.). The user entity 402 can further include a DatetimeCreated indication of when the user's account was created, an OnlineStatus indicating whether the user is currently online, a LastLogin time, a LastUpdate time, PrivacySettings for the user, and Notes about the user's account.

As illustrated, the database 400 further includes a SCN post entity 404 (illustrated as "FriendFly Post"). In some embodiments, the SCN post entity 404 can be utilized to display each of the posts the user makes on each of their separate social networks. As illustrated, the SCN post entity 404 can include a PostID, PostText, a PostImage, and a PostVideo of the post. As illustrated, the SCN post entity 404 can further include a PostStatus of the post (e.g., active, duplicate, deleted, flagged as inappropriate). In some embodiments, a user can post the same (or relatively the same) information on more than one social network. In accordance with these embodiments, a server running the SCN, such as the mobile application server 106 of FIG. 1, can determine whether a post is duplicated across multiple social networks, and cannot create a duplicate SCN post entity 404. Instead, the server can utilize one or more of a SocialNetworkPost indication and a FacebookPost indication to indicate which of the multiple social networks the post is duplicated on. In accordance with these embodiments, another user of the SCN can be able to observe one post by the user with an indication of each and every social network the post was made on. In one embodiment, each post within the SCN can be identified by one or more of the UserID of the user that creates the post, or the PostID of the post.

As illustrated, the database 400 further includes a local contacts list entity 406. In some embodiments, the local contacts list entity 406 can be utilized so that the user can link or synchronize the personal contact information on their device with the personal contact information of other users of the SCN. For example, as illustrated, the local contacts list entity 406 can include a list of PhoneNumbers, a list of FirstNames and LastName, a list of Addresses, and a list of Emails, wherein each of the field entries corresponds to a contact from the contact list on the user's device. In some embodiments, one or more of the contacts in the local contacts list entity 406 can also correspond to another user of the SCN. In accordance with these embodiments, the corresponding one or more contacts can be identified, and the personal contact information stored in the local contacts list entity 406 can be associated with a corresponding SCN account of the identified contact. Additionally or alternatively, the local contacts list entity 406 can be utilized to add new contacts to the contact list on the user's device. For example, the user can add a new connection through the connection process described herein, and the personal contact information of the new connection can be added or "pushed" to the contact list on the user's device. In one embodiment, each contact list stored can be identified by the UserID of the user from which the contact list originates.

As illustrated, the database 400 further includes a SCN contact connection entity 408 (illustrated as "FriendFly Contact Connection"). In some embodiments, the SCN contact connection entity 408 can be utilized to indicate the connection between two SCN users (e.g., friendship connection). As illustrated, the SCN contact connection entity 408 can include a ConnectionID of the connection, and a ConnectionStatus indication which can indicate whether the connection is requested, accepted, or blocked. In some embodiments, the SCN contact connection entity 408 can further include a list of PhoneNumbers for the contact, a list of Addresses for the contact, and a list of Emails for the contact. In one embodiment, this contact information can be synchronized with personal contact information stored on the device of the user, such as a mobile phone accessing the SCN. In one embodiment, each SCN contact connection 408 can be identified by one or more of the set of UserIDs for the users of the connection or the ConnectionID of the connection.

As illustrated, the database 400 further includes a social network information entity 410. In some embodiments, the social network information entity 410 can include information about the user's account on a separate social network (e.g., Google Plus). As illustrated, the social network information entity 410 can include a NetworkScreenName, a Password, PrivacySettings which can indicate whether the user's account is public or private, and a ContactsList for the user within the social network. As illustrated, the social network information entity 410 can further include an AccountStatus of the user's account within the social network, and a NetworkName and a NetworkType for the social network, which can respectively indicate the name of the social network and whether the social network is a friend network, a follow network, or some other network. In one embodiment, each social network information entity 410 can be identified by one or more of the set of UserID of the user or the SocialNetworkID of the user within the social network.

As illustrated, the database 400 further includes a network contact connection entity 412. In some embodiments, the network contact connection entity 412 can be similar to one of the social network connections$_{N1-M}$ 162-168 of FIG. 1. In some embodiments, the network contact connection entity 412 can indicate that two users are connected within the social network. As illustrated, the network contact connection entity 412 can include a NetworkConnectionID, which can identify the connection between two users of the social network. As illustrated, the network contact connection entity 412 can further include a set of SocialNetworkIDs corresponding to each of the connected users, and a FriendStatus for the connection. In one embodiment, each social network connection can be identified by one or more of the set of UserIDs for the users of the connection or the NetworkConnectionID of the connection.

In some embodiments, the database 400 can include separate entities, similar to the social network information entity 410 and the network contact connection entity 412, for each social network supported. For example, as illustrated, the database 400 further includes a Facebook information entity 414. In some embodiments, the Facebook information entity 414 can include information about the user's Facebook account. As illustrated, the Facebook information entity 414 can include a FacebookScreenName, a Password, PrivacySettings, a ContactsList, and an Account status of the user's Facebook account. As illustrated, the Facebook information entity 414 can further include a NetworkName and NetworkType fields indicating that the social network is named "Facebook" and that the social network is a friend network. As illustrated, the database 400 further includes a Facebook contact connection entity 416, which can be similar to one of the social network connections$_{N1-M}$ 162-168 of FIG. 1, and can indicate that two users are connected within Facebook (e.g., friends). As illustrated, the Facebook connection entity 416 can include a FacebookConnectionID identifying the connection between two Facebook users, a set of FacebookIDs corresponding to each of the connected users, and a FriendStatus for the connection. In one embodiment, each Facebook contact connection entity 416 can be identified by one or more of the set of UserIDs for the users of the connection or the FacebookConnectionID of the connection.

As illustrated, the database 400 further includes a group member entity 418. In some embodiments, the group member entity 418 can be utilized to indicate which users of the SCN are members of a group within the SCN. As illustrated, the group member entity 418 can include a GroupID for the group and a RequestStatus for the user. In some embodiments, the RequestStatus can indicate whether the user has requested to be a member of the group, whether the user has been accepted as a member of the group, or whether the user is blocked from the group. In one embodiment, each group member entity 418 can be identified by one or more of the GroupID for the group and the UserID for the user.

As illustrated, the database 400 further includes a SCN group entity 420 (illustrated as "FriendFly Group"). In some embodiments, the SCN group entity 420 can be utilized to store information about a group within the SCN. As illustrated, the SCN group entity 420 can include a GroupName for the group, a Group Status for the group that can indicate whether the group is active, PrivacySetting for the group that can indicate whether the group is public or private, and a list of members of the group in a MemberList. In one embodiment, each SCN group entity 418 can be identified the GroupID for the group.

As illustrated, the database 400 further includes a local group entity 422. In one embodiment, the user can be able to utilize the local group entity 422 to group their SCN contacts into groups that are unique to the user. For example, the user can wish to group each of their SCN contacts based on whether the contact is a family member, a colleague from work, an acquaintance from school, a neighbor, etc. As illustrated, the local group entity 422 can include a LocalGroupID for the group, a LocalGroupName for the group, and a list of members of the group in a MemberList. In one embodiment, each local group entity 422 can be identified by one or more of the LocalGroupID for the group and the UserID of the user.

The various entities of the database 400 described herein can include more or less information than illustrated. In some embodiments, the various entities cannot exist within the database 400, or additional entities can be present. In some embodiments, at least a portion of the entities can be combined.

Figure 5:
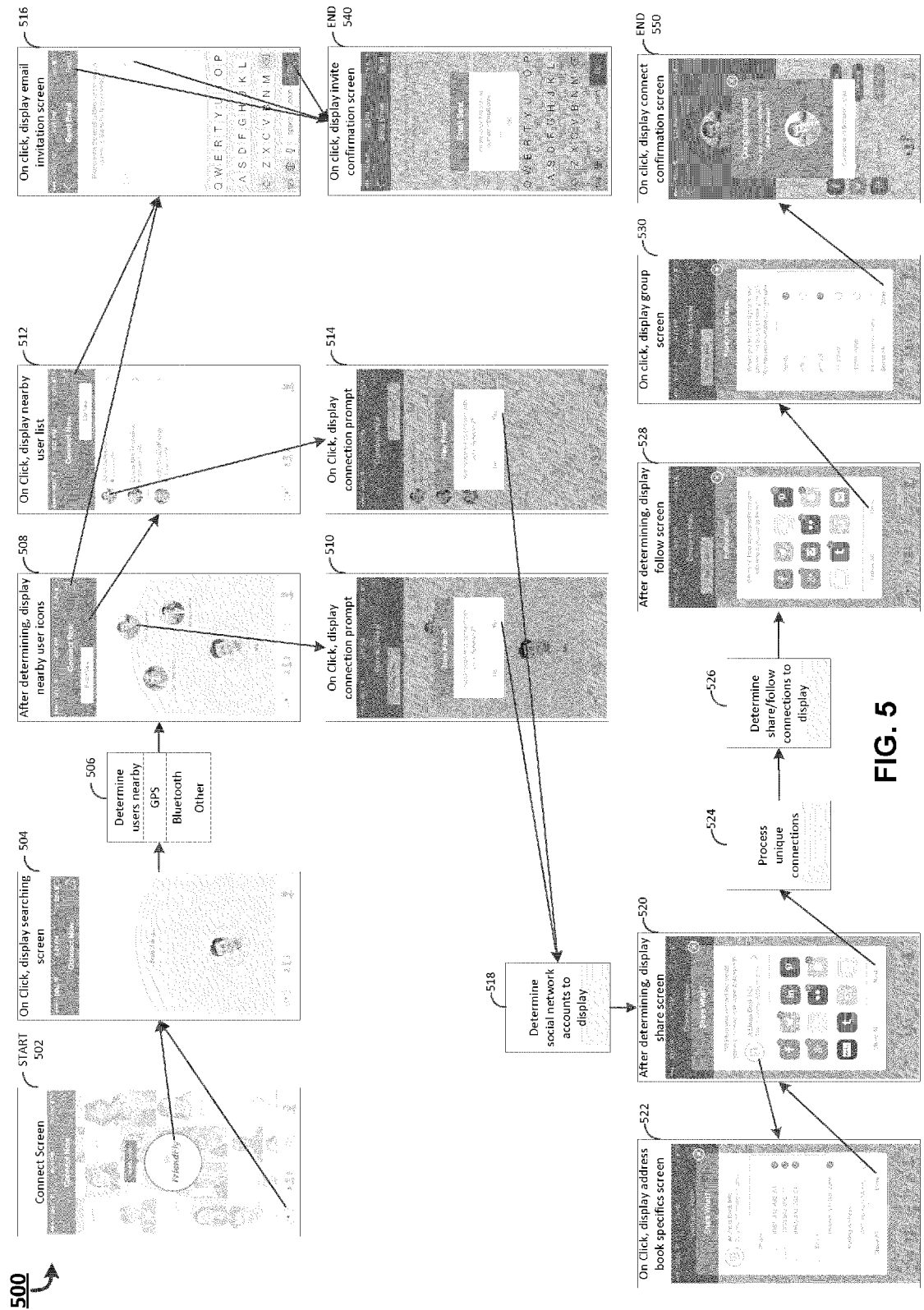
FIG. 5 shows an exemplary flowchart of a SCN connection process, according to an embodiment.

FIG. 5 shows an exemplary flowchart of a SCN connection process 500, according to an embodiment. In some embodiments, the SCN connection process 500 can be implemented to synchronization of relationship connections across a plurality of social networks in a unified manner. For example, SCN connection process 500 can connect users to more than one social network at a time. In some embodiments, the SCN connection process 500 can be implemented using a computer, such as a mobile wireless device. In one embodiment, the various steps of the SCN connection process 500 can be executed using a cellular phone or smart tablet with a touchscreen device.

At step 502, a connect screen can be displayed on a computer (e.g., wired or wireless device), such as the first mobile user device 102 of FIG. 1. In one embodiment, the first user can have previously logged into the SCN using the first mobile user device 102. In accordance with this embodiment, the connect screen can be displayed to the first user automatically, or the first user can otherwise navigate to the connect screen. In one embodiment, the first user can log into the SCN using the ScreenName and Password for the instance of the user entity 402 that corresponds to the first user (e.g., through the first user's account). In one embodiment, the first user can click on, navigate over, or otherwise select a portion of the connect screen, and upon doing so, the SCN connection process 500 can proceed to step 504.

At step 504, a searching screen can be displayed on the first mobile user device 102. In one embodiment, the searching screen can include graphics that are displayed to the first user during step 506. At step 506, it is determined which users are nearby. In various embodiments, this determination is made, at least in part, by the first mobile user device 102. In one embodiment, the first mobile user device 102 can utilize NFC or Bluetooth. In accordance with this embodiment, an NFC circuit or Bluetooth circuit residing on the first mobile user device 102 can search for other computers transmitting an NFC or Bluetooth message (e.g., a discovery message). If the NFC circuit or Bluetooth circuit identify or discover any other computers transmitting the NFC or Bluetooth message, the NFC circuit or Bluetooth circuit can obtain information about the user(s) of the other computer(s). For example, in one embodiment, the first mobile user device 102 can identify the second mobile user device 104 of FIG. 1, and obtain information about a second user (or the second user's account) using the second mobile user device 104. Thereafter, the SCN confection process 500 can proceed to step 508.

In one embodiment, at step 506 the first mobile user device 102 can utilize GPS. In accordance with this embodiment, the first mobile user device 102 can obtain additional information from a server, such as the mobile application server 106 of FIG. 1. For example, in one embodiment, the first mobile user device 102 can transmit an indication of the GPS coordinates of the first user (e.g., of the first mobile user device 102) to the server. In accordance with this embodiment, the first mobile user device 102 can thereafter receive an indication, from the server, of other users identified by the server. In one embodiment, the server can utilize the GPSDistanceSetting of the user entity 402 instance for the first user, and can only transmit an indication for users identified within the specified distance. After receiving the indication, the first mobile user device 102 can proceed to step 508. In one embodiment, the first mobile user device 102 can utilize another technique that is not GPS, NFC, or Bluetooth in addition to, or alternatively from using GPS, NFC, or Bluetooth.

At step 508, the first mobile user device 102 can display nearby user icons. In one embodiment, the nearby user icons are displayed in a spatial arrangement. For example, the nearby user icons can be displayed on the first mobile user device 102 based on how close each of the other users (e.g., the devices of the users) are to the first user (e.g., to the first mobile user device 102). In one embodiment, the nearby user icons are displayed on the first mobile user device 102 based on a determination of the degree of interconnectivity between the first user account and each of the other users' accounts. In one embodiment, an algorithm can be implemented with respect to each of the other nearby users. For example, in one embodiment, the algorithm can determine a numerical value to assign to a second user, based at least in part on one or more of: how many of the separate social networks the first and second users are already connected on, how many connections to other users the first and second users have in common, how many SCN groups the first and second users have in common, how far away the first user's GPS coordinates are from the second user's GPS coordinates, or other indicia. Once this numerical value is determined for each nearby user, the user icons for each nearby user can be displayed on the first mobile user device 102 based on the numerical value determined for each. For example, icons for the users with a higher determined degree of interconnectivity can be displayed closer to an icon of the first user, while icons for the users with a lower determined degree of interconnectivity can be displayed further from the icon of the first user.

Once the nearby user icons are displayed, the first user can select to view a list of the nearby users (e.g., by selecting the "List View" button). In this event, the first mobile user device 102 can proceed to step 512, where the nearby user icons are displayed in a list form. In one embodiment, the user icons are displayed from top to bottom based at least in part on their proximity or distance (e.g., GPS) from the first user. In one embodiment, the user icons are displayed based on their degree of interconnectivity, similar to step 508.

In either one or both of steps 508 and 512, each user icon can be accompanied by one or more of the name of the user (e.g., first name and last name), a screen name of the user, a location of the user, a birthplace of the user, a residence of the user, etc. In either one or both of steps 508 and 512, the first user can select to send an email invite to another user. The first user can wish to do this if the another user is not registered with the SCN, or an icon corresponding to the another user is not displayed on the first mobile user device 102. If the first user selects to send the email invite, the SCN connection process 500 can proceed to step 516, where an email invitation screen is displayed on the first user device 102. The first user can enter an email address of the another user. In one embodiments, the first user can additionally or alternatively enter a phone number of the another user. In either event, the first user can select to send the invite to the another user, and the SCN connection process 500 can proceed to step 540, where an invite confirmation screen is displayed on the first user device 102. In one embodiment, once the SCN connection process 500 reaches step 540, the SCN connection process 500 can end.

Referring back to step 508, the first user can select the icon corresponding to a second user. Upon selecting this icon, the SCN connection process 500 can then proceed to step 510, where a connection prompt is displayed on the first user device 102. For example, as illustrated, the connection prompt can ask whether the first user would like to connect with the second user. In one embodiment, the connection prompt can be an overlay to the screen displayed in step 508. Similarly, at step 512, the first user can select the icon corresponding to the second user. Upon selecting this icon, the SCN connection process 500 can then proceed to step 514, where a connection prompt is displayed on the first user device 102, similar to step 510, which can be an overlay to the screen displayed in step 512. In either one or both of steps 510 and 514, the first user can select that they wish to connect with the second user, and the SCN connection process 500 can then proceed to step 518. In one embodiment, upon selecting to connect with the second user, the server (e.g., mobile application server 106) can create a session information entity 422 instance for the connection session between the first and second user, and the instance can be identified by a SessionID. In one embodiment, in the event that the first or second user is removed from the SCN connection process 500 (e.g., an application running on either users' device crashes or the device powers off), either one or both of the first or second users, or their respective devices, can be able to resume the connection process by utilizing the SessionID. In some embodiments, additional information about the connection session can be stored so that the first and second user can resume the connection session at approximately the same step (e.g., one of steps 518-530 described below) the left off at before an issue occurred. In some embodiments, initiating upon selecting to connect with the second user, the server may send a push notification to an operator (e.g., Apple or Microsoft) of the device being used by the second user in the SCN connection process 500, such as the second mobile user device 104, and the operator may send a push notification to the second mobile user device 104. In some embodiments, the second user may accept the push notification on the second mobile user device 104, and another push notification may be sent to the first mobile user device 102. In various embodiments described herein, any of the communications sent from the server to one or more of the first mobile user device 102 or the second mobile user device 104 may be via a "push" notification, which may come an operator of the device.

At step 518, it can be determined which social network accounts to display. In one embodiment, this determination can be made at least in part by the server (e.g., mobile application server 106). For example, the server can determine whether the first user and the second user are already connected on one or more of the separate social networks. In one exemplary embodiment, the server can make this determination based on the information contained in the database 400 of FIG. 4. For example, the server can utilize one or more of the social network information entity 410, the network contact connection entity 412, the Facebook information entity 414, or the Facebook contact connection entity 416 instances for one or both of the first or second users. Once the server determines each social network on which the first and second users are connected, the SCN connection process 500 can continue to step 520.

At step 520, the first mobile user device 102 can display a share screen. In some embodiments, this share screen can be utilized by the first user to select any number of social networks (which the first user has linked their SCN account to) that the first user wishes to share with the second user. For example, as illustrated in step 520, the first user can have linked their SCN account with their Facebook, Twitter, LinkedIn, Pinterest, Google Plus, Flickr, Snapchat, Meetup, Tumblr, and Reddit accounts. Also as illustrated, the first user can select to only share their Facebook, Twitter, Google Plus, Flickr, and Snapchat accounts with the second user. In one embodiment, each of the follow networks of the first user that are "public" can be automatically preselected (e.g., checked) on the share screen. For example, in one embodiment, the first user's Twitter account can be public, and therefore the Twitter icon on the share screen can have a check mark indication next to it when it is first displayed. In one embodiment, the first user can be able to deselect their Twitter account, and the check mark indication can no longer be displayed. In one embodiment, the server can determine whether the first user's Twitter account is public based at least in part on the PrivacySettings of the social network information entity 410 instance for the first user's Twitter account.

In some embodiments, each separate social network on which the first and second users are already connected can be preselected on the displayed share screen, and the first user cannot be able to deselect these preselected social networks. In one embodiment, an additional indication can be provided for these preselected social networks, such as an outline around the icon of each preselected social network. As further illustrated, the first user cannot have registered an Instagram or VK account with their SCN account. In some embodiments, separate social networks supported by the SCN, but for which the first user has not linked an account on the separate social network to their SCN account, cannot be displayed, or can otherwise be displayed as greyed-out. In some embodiments, the accounts displayed on the share screen can be based on the accounts linked through to the second user's account. For example, if the second user has not linked a Tumblr account to their SCN account, then the icon for Tumblr cannot be displayed, or can otherwise be greyed-out. Once the first user is done selecting which social network accounts they wish to share with the second user, the first user can submit their selections. Once the first user submits their selections, the SCN connection process 500 can proceed to step 524. In some embodiments, submitting the first user's selection can initiate the generation of a connection invitation for the second user to join one or more of the first user's social network accounts.

In some embodiments, address book information can additionally or alternatively be shared during the SCN connection process 500. For example, as illustrated in step 520, an address book information icon can be displayed. Upon selecting the address book information icon, the SCN connection process 500 can proceed to step 522 where the first mobile user device 102 can display an address book specifics screen. In some embodiments, the address book specifics screen can allow the first user to select any number of phone numbers, email addresses, mailing addresses, etc. which the first user wishes to share with the second user. For example, as illustrated, the first user can have registered three different phone numbers, one email address, and one mailing address with the SCN. Also as illustrated, the first user can select to share all three phone numbers and the one email address with the second user, but can otherwise indicate that they do not wish to share their one mailing address with the second user. In some embodiments, this personal contact information can be obtained by the server from the user entity 402 instance for the first user. In various embodiments, if the first user decides to share any piece of information from their address book, this may automatically be shared with the second user, without the second user selecting to accept the address book information. In some embodiments, after the connection process is over and the first user has shared address book information with the second user, once the first user changes the address book information (e.g., a phone number or mailing address), the second user may automatically see the changes may. As a non-limiting example of a benefit of the various embodiments described herein, the SCN may provide an easy to use method of keeping up to date information on other users (e.g., friends, family, acquaintances, etc.). After making this selection of specific address book information to share, the first user can select that they are done, and the SCN connection process 500 can return to step 520.

In some embodiments, the first user can set defaults for sharing accounts and other information. For example, in one embodiment, the first user can wish to always share their Facebook, Google Plus, and Snapchat accounts with other users, in addition to their cell phone number and personal email. In accordance with this embodiment, the first user can set up these defaults within their SCN account so that these accounts and address book contacts are selected by default each time the first user conducts the SCN connection process 500 with another user.

In various embodiments, screens similar to the share screen of step 520 or the address book specifics screen of step 522 can be displayed to the second user on the second mobile user device 104. Further, the server can receive a similar selection of social networks or address book information which the second user wishes to share with the first user. Receiving this selection can be necessary before proceeding to step 524.

At step 524, unique connections can be processed. In some embodiments, an application programming interface (API) of a specific social network can require additional steps for sending or accepting requests to connect the first user to the second user on the specific social network. For example, the API for Facebook can require that the first and second users utilize a browser to accept or reject a Facebook friend request. In one embodiment, a browser within the application configured to implement the SCN connection process 500 (referred to as an "in-app browser") can be utilized. In either event, during step 524, the first or second user can generate a friend request for the other user within the browser, and the other user can accept the friend request within the browser. In some embodiments, the server can be configured to generate the Facebook friend request, and the first user, the second user, or both can accept the generated friend request through the browser. If there are additional unique connections to process, they can be processed at step 524, before or after the Facebook friend request is processed. After all unique connections are processed, SCN connection process 500 can proceed to step 526.

At 526, it can be determined which share or follow connections to display. In some embodiments, this determination can be made by the server. For example the server can compare the selections made by the first and second users during step 520. Namely, the server can determine whether both the first and second users selected to share their social network accounts for each friend network, and whether the first or second user selected to share any of their social network accounts for each follow network. Once this determination is made, the SCN connection process 500 can then proceed to step 528. In addition to, or as a part of, determining which share or follow connections to display in step 526, the server can further initiate connection requests for each of the friend networks on which both the first and the second users selected in step 520. For example, if both the first and second users selected to share their Google Plus accounts in step 520, then the server can connect the Google Plus account of the first user to the Google Plus account of the second user. In some embodiments, the server can utilize Google Plus account information for each of the first and second users stored in the database 400. For example, in one embodiment, the SocialNetworkID and SocialNetworkPassword of the user entity 402 instances corresponding to the first and second users can be utilized to access the Google Plus accounts of the first and second users. Once the Google Plus accounts of the first and second users are accessed, the server can initiate generating a connection request from one of the users, and can initiate accepting the connection request by the other user (e.g., a Google Plus friend request). In some embodiments, initiating the connection requests cannot occur until later in the SCN connection process 500 (e.g., after step 528, step 530, or step 550).

At step 528, a follow screen can be displayed on the first mobile user device 102. In various embodiment, the information displayed by the follow screen is based on the determinations made in step 526. In some embodiments, an indication for each follow network that was selected by the second user in step 520 can be displayed. For example, as illustrated in the follow screen, the second user can have selected to share their Instagram and Tumblr account information with the first user, and the icons corresponding to Instagram and Tumblr can be displayed in color. Also as illustrated, the first user can select to follow the second user's Tumblr account, but cannot select to follow the second user's Instagram account. In some embodiments, an indication for each friend networks that both of the first and second users selected in step 520 can be displayed. For example, both of the first and second users can have selected to share their Google Plus accounts. As illustrated, a Google Plus icon can be displayed in color with a check mark next to it, which can indicate that the first and second user are now connected through their accounts on Google Plus. In one embodiment, if one or both of the first or second users did not select a particular friend or follow network in step 520, then an icon for that social network cannot be displayed, or can otherwise be displayed as greyed-out. Similarly, networks for which the second user account does not have a separate social network account linked cannot be displayed, or can otherwise be displayed as greyed-out. Similar to the discussion above, the first user can set up defaults for accepting the shared social network accounts from other users during the connection process.

Upon selecting the social networks which the first user wishes to follow, the SCN connection process 500 can proceed to step 530.

At step 530, a group screen is displayed on the first mobile user device 102. Once displayed, the first user can select any number of groups which the first user wishes to add the second user to. For example, as illustrated, the first mobile user device 102 can display that the second user account can be assigned to any one of a family, office, school, neighbor, dorm mate, or bikers community group. As further illustrated, the first user can select to add the second user account to the family and school groups. In some embodiments, the first user can create or remove groups that the user wishes to use to assign their contacts to. In one embodiment, the server can utilize the local group entity 422 to display the group screen and to store the second user within the groups selected by the first user. Once the user has selected the groups they wish to add the second user to, the SCN connection process 500 can proceed to step 550, where a connection confirmation screen is displayed on the first mobile user device 102. In some embodiments, the SCN connection process 500 can end at step 550.

Figure 6:
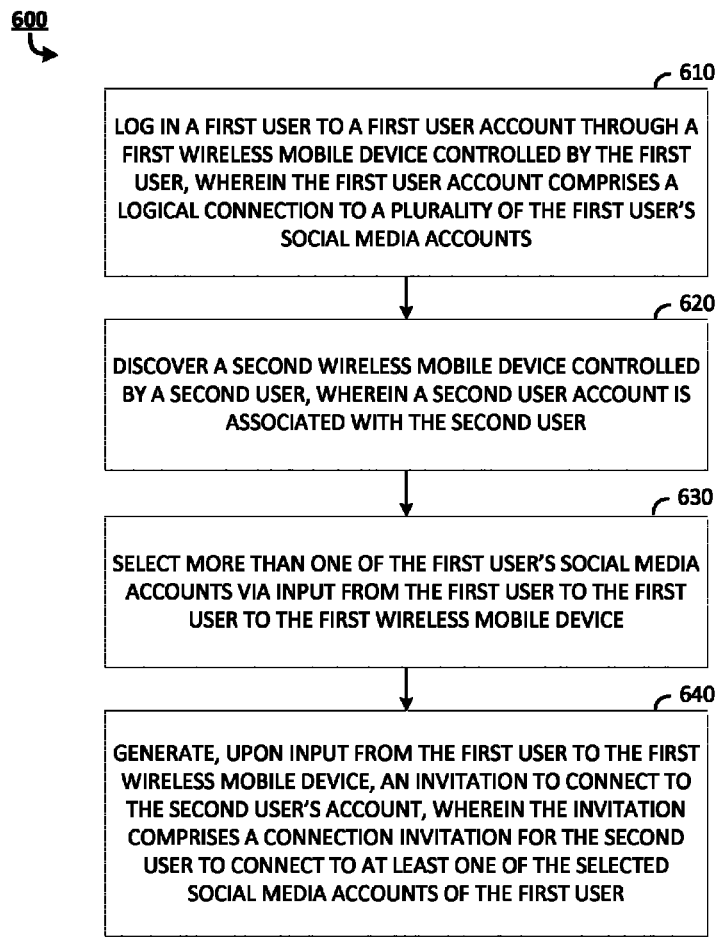
FIG. 6 illustrates an exemplary method for unified synchronization of relationship connections across a plurality of social networks, according to an embodiment.

FIG. 6 illustrates an exemplary method 600 SCN connection process 500, according to an embodiment. Method 600 can contain more or less steps than illustrated, and the steps can be performed in a different order. In some embodiments, method 600 can be performed by a user device, such as the first mobile user device 102 or the second mobile user device 104 of FIG. 1.

Method 600 starts at block 610, where the first mobile user device 102 controlled by a first user, for example, logs in the first user to a first user account, wherein the first user account includes a logical connection to a plurality of the first user's social network accounts. In some embodiments, the first user's social network accounts can include at least two of Facebook, Twitter, LinkedIn, Pinterest, Google Plus, Instagram, and VK.

Method 600 next moves to block 620, where the first mobile user device 102, for example, discovers a second wireless mobile device controlled by a second user, wherein a second user account is associated with the second user. In various embodiments, discovering includes discovering a list of nearby user accounts through the use of a near field or Bluetooth communication protocol (e.g., Bluetooth low energy), wherein the list of nearby user accounts includes the second user account. In some embodiments, discovering includes discovering a list of nearby user accounts through the use of geolocation information, wherein the list of nearby user accounts includes the second user account. In accordance with any of these embodiments, method 600 can further include displaying, by the first mobile user device 102, for example, a plurality of user icons corresponding to the nearby user accounts in a spatial relationship, wherein the spatial relationship is based at least in part upon a proximity of each of the nearby user accounts to the first user. For example the user account with the closest determined proximity can be displayed in the foreground, while the remaining discovered user accounts can be displayed in the background. In one embodiment, the spatial relationship can additionally or alternatively be based on a determined level of connectivity between the first user account and the second user account. For example, a server, such as the mobile application server 106 of FIG. 1, can compare the number of connections the first user account and the second user account have in common (e.g., how many of the same Facebook and/or Google Plus friends each of the user accounts have). This determination can be made for each of the discovered user accounts, and the user account with the highest determined level of connectivity can be displayed in the foreground, while the remaining discovered user accounts can be displayed in the background.

Method 600 next moves to block 630, where the first mobile user device 102, for example, selects more than one of the first user's social network accounts via input from the first user to the first user to the first wireless mobile device. In some embodiments, the selected first user's social network accounts can include the social network accounts which the first user wishes to share with the second user. In accordance with these embodiments, the first and second user can be able to share or connect on more than one social network at a time. In various embodiments, the first user can only be allowed to select the social network accounts for which the first user is not already connected to the second user. In one embodiment, these preexisting connections can be displayed or otherwise indicated on the first mobile user device 102.

Method 600 next moves to block 640, where the first mobile user device 102, for example, generates, upon input from the first user, an invitation to connect to the second user's account, wherein the invitation includes a connection invitation for the second user to connect to at least one of the selected social network accounts of the first user. In some embodiments, a server, such as the mobile application server 106 of FIG. 1 for example, can instead generate the invitation to connect. In accordance with these embodiments, the first mobile user device 102 can be perceived as initiating the generation of the connection invitation.

In some embodiments, the invitation can further include personal contact information including at least one of a telephone number of the first user, an email address of the first user, and a mailing address of the first user. In accordance with these embodiments, the first and second user can be able to exchange personal contact information in addition to connecting on more than one social network.

In some embodiments, the method 600 can further include, sending, by the first mobile user device 102, for example, the invitation to the second user account, wherein the invitation is accessible through the second wireless mobile device. In one embodiment, the second wireless mobile device can be the second mobile user device 104 of FIG. 1. In some embodiments, sending the invitation can be done via the network 114 of FIG. 1, for example. In various embodiments, a server, such as the mobile application server 106 for example, can instead send the invitation to connect. In accordance with these embodiments, the first mobile user device 102 can be perceived as initiating the sending of the connection invitation.

In some embodiments, the method 600 can further include, displaying, by the first mobile user device 102, for example, an invitation to connect from the second user's account on the first wireless mobile device, wherein displaying includes indicating which of a plurality of the second user's social network accounts the first user can connect with. In some embodiments, the indicated second user's social network accounts can include one or more of the second user's social network accounts that the second user selected to share with the first user, similar to the social network accounts selected by the first user in block 630. In some embodiments, the method 600 can further include, selecting, by the first mobile user device 102, any number of the indicated second user's social network accounts to connect with via input from the first user, and generating, based on the first user's social network accounts selected and the second user's social network accounts selected, more than one connection between one of the plurality of the first user's social network accounts and one of the plurality of the second user's social network accounts. In some embodiments, a server, such as the mobile application server 106 for example, can instead generate the the more than one connection. In accordance with these embodiments, the first mobile user device 102 can be perceived as initiating the generation of the more than one connection.

In some embodiments, the method 600 can further include, selecting, by the second mobile user device 104, for example, more than one of the second user's social network accounts via input from the second user, and determining, by a server, such as the mobile application server 106 for example, a list of social network accounts to include in the invitation based upon a comparison of the first user's social network accounts selected and the second user's social network accounts selected.

Figure 7:
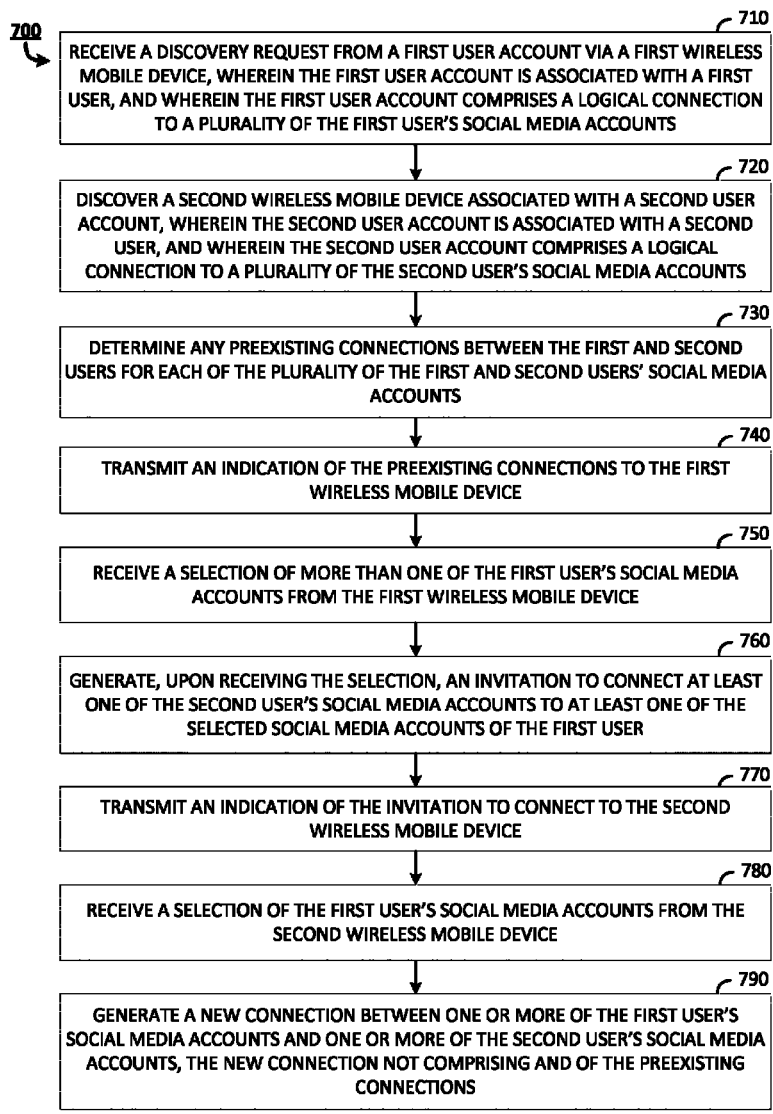
FIG. 7 illustrates another exemplary method for unified synchronization of relationship connections across a plurality of social networks, according to an embodiment.

FIG. 7 illustrates another exemplary method 700 SCN connection process 500, according to an embodiment. Method 700 can contain more or less steps than illustrated, and the steps can be performed in a different order. In some embodiments, method 700 can be performed by a server, such as the mobile application server 106 of FIG. 1.

Method 700 starts at block 710, where the mobile application server 106, for example, receives a discovery request from a first user account via a first wireless mobile device, wherein the first user account is associated with a first user, and wherein the first user account includes a logical connection to a plurality of the first user's social network accounts. In some embodiments, the first wireless mobile device can be the first mobile user device 102 of FIG. 1. In various embodiments, the logical connections to the plurality of the first user's social network accounts can be similar to the social network connections 150 of FIG. 1.

Method 700 next moves to block 720, where the mobile application server 106, for example, discovers a second wireless mobile device associated with a second user account, wherein the second user account is associated with a second user, and wherein the second user account includes a logical connection to a plurality of the second user's social network accounts. In some embodiments, the second wireless mobile device can be the second mobile user device 104 of FIG. 1. In various embodiments, the logical connections to the plurality of the second user's social network accounts can be similar to the social network connections 150 of FIG. 1. In one embodiment, the second wireless mobile device can be discovered through the use of GPS, or a near field or Bluetooth communication protocol.

Method 700 next moves to block 730, where the mobile application server 106, for example, determines any preexisting connections between the first and second users for each of the plurality of the first and second users' social network accounts. In some embodiments, these preexisting connections can be similar to one or more of the connections$_{N1-NM}$ 162-168 of FIG. 1. For example, if the first and second user are already friends on the Nth social network (Google Plus, for example), connection$_{N2}$ 164 can correspond to this "preexisting" connection between the users. Thus, the mobile application server 106 can locate this connection$_{N2}$ 164 at block 730.

Method 700 next moves to block 740, where the mobile application server 106, for example, transmits an indication of the preexisting connections to the first wireless mobile device. In some embodiments, this indication can provide sufficient information for the first mobile device to display indications of each of the social networks the first and second user are connected on, and which social networks the first and second user are not connected on. In some embodiments, this can allow the first user, for example, to select any number of the social networks on which they wish for the second user to connect with them (e.g., the social networks on which the first and second users were not previously connected).

Method 700 next moves to block 750, where the mobile application server 106, for example, receives a selection of more than one of the first user's social network accounts from the first wireless mobile device. In some embodiments, this selection can include any number of social networks which the first and second users were not previously connected.

Method 700 next moves to block 760, where the mobile application server 106, for example, generates, upon receiving the selection, an invitation to connect at least one of the second user's social network accounts to at least one of the selected social network accounts of the first user. In some embodiments, this indication can provide sufficient information for the second mobile device to display indications of each of the social networks the first and second user are connected on, which social networks the first and second user are not connected on, which social networks the first user is requesting connections for, and which social networks are otherwise available for the second user to connect with the first user.

Method 700 next moves to block 770, where the mobile application server 106, for example, transmits an indication of the invitation to connect to the second wireless mobile device. In some embodiments, this indication can allow the second user to select any number of the social networks on which they wish to connect with the first user (e.g., the social networks which the first user selected, on which the first and second users were not previously connected).

Method 700 next moves to block 780, where the mobile application server 106, for example, receives a selection of the first user's social network accounts from the second wireless mobile device. In some embodiments, the selected first user's social network accounts can indicate which of first user's social network accounts the second user wishes to connect with.

Method 700 next moves to block 790, where the mobile application server 106, for example, generates a new connection between one or more of the first user's social network accounts and one or more of the second user's social network accounts, the new connection not comprising and of the preexisting connections. In one embodiment, the mobile application server 106 can determine that both the first user and the second user have both selected to connect their respective social network accounts on a particular social network. This determination can occur earlier, at block 760, for example. In accordance with this embodiment, the mobile application server 106 can generate a request to connect and accept the request to connect within the particular social network itself. For example, the mobile application server 106 can determine that both the first user and the second user have selected to share their Google Plus account information with each other (e.g., in block 750). Thereafter, the mobile application server 106 can use the login information of the first user to generate a Google Plus friend request for the second user, and can use the login information of the second user to accept the generated friend request. In some embodiments, the mobile application server 106 can determine that the first user has selected to follow the second user's Instagram account (e.g., in block 780). Thereafter, the mobile application server 106 can use the login information of the second user to generate an Instagram follow request for the first user, and can use the login information of the first user to accept the generated follow request. If the first user's Instagram is public, then the acceptance of the follow request on Instagram's network can be automatic.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above can be performed by any suitable means capable of performing the operations, such as various hardware or software component(s), circuits, or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration. The various circuits and components described above may be referred to herein as a computer or device.

In one or more embodiments, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some embodiments computer readable medium can comprise non-transitory computer readable medium (e.g., tangible media). In addition, in some embodiments computer readable medium can comprise transitory computer readable medium (e.g., a signal). Combinations of the above should also be included within the scope of computer-readable media.

The methods disclosed herein comprise one or more steps or actions for achieving the described method. The method steps or actions can be interchanged with one another without departing from the scope of the claims. In other words, unless a specific order of steps or actions is specified, the order or use of specific steps or actions can be modified without departing from the scope of the claims.

Further, it should be appreciated that modules or other appropriate means for performing the methods and techniques described herein can be downloaded or otherwise obtained by a user terminal or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal or base station can obtain the various methods upon coupling or providing the storage means to the device. Moreover, any other suitable technique for providing the methods and techniques described herein to a device can be utilized.

While the foregoing is directed to embodiments of the present disclosure, other and further embodiments of the disclosure can be devised without departing from the basic scope thereof, and the scope thereof is determined by the claims that follow.

The invention claimed is:

1. A method for unified synchronization of relationship connections across a plurality of social networks, comprising:

logging in a first user to a first user account through a first wireless mobile device controlled by the first user, wherein the first user account comprises a logical connection to a plurality of the first user's social network accounts;

discovering, by the first wireless mobile device, a second wireless mobile device controlled by a second user, wherein a second user account is associated with the second user;

selecting more than one of the first user's social network accounts via input from the first user to the first wireless mobile device;

upon receiving the input from the first user to the first wireless mobile device, causing a generation of a first invitation, wherein the first invitation comprises a connection invitation for the second user to connect to the selected social network accounts of the first user;

sending the first invitation to the second user account;

displaying a second invitation to connect from the second user's account on the first wireless mobile device in response to the first invitation having been accepted, wherein the displaying comprises indicating which of a plurality of the second user's social network accounts the first user may connect with;

selecting a plurality of the indicated second user's social network accounts to connect with via input from the first user to the first wireless mobile device; and receiving data indicative of more than one generated connection between the selected plurality of the first user's social network accounts and the selected plurality of the second user's social network accounts.

2. The method of claim 1, wherein the first invitation is accessible through the second wireless mobile device.

3. The method of claim 1, further comprising:

receiving a selection of more than one of the second user's social network accounts via the second wireless mobile device; and determining a list of social network accounts to include in the first invitation based upon a comparison of the first user's selected social network accounts and the second user's selected social network accounts.

4. The method of claim 1, wherein the discovering comprises discovering a list of nearby user accounts through the use of a near field or Bluetooth communication protocol, and wherein the list of nearby user accounts includes the second user account.

5. The method of claim 1, wherein the discovering comprises discovering a list of nearby user accounts through the use of geolocation information, and wherein the list of nearby user accounts includes the second user account.

6. The method of claim 5, further comprising:

displaying, on the first wireless mobile device in a spatial relationship, a plurality of user icons corresponding to the nearby user accounts, wherein the spatial relationship is based at least in part upon a proximity of each of the nearby user accounts to the first user.

7. The method of claim 1, wherein the first invitation further comprises personal contact information including at least one of:

a telephone number of the first user, an email address of the first user, and a mailing address of the first user.

8. A first mobile wireless device for unified synchronization of relationship connections across a plurality of social networks, the first mobile wireless device comprising:

a processor and a memory configured to store and execute software to:

log in a first user to a first user account, wherein the first user account comprises a logical connection to a plurality of the first user's social network accounts; and discover a second wireless mobile device controlled by a second user, wherein a second user account is associated with the second user; and a user interface configured to:

receive a selection of more than one of the first user's social network accounts;

wherein the software is further configured to:

generate a first invitation upon receiving the selection, wherein the first invitation comprises a connection invitation for the second user to connect to the selected social network accounts of the first user;

send the first invitation to the second user account;

display a second invitation to connect from the second user's account in response to the first invitation having been accepted, wherein the displaying comprises indicating which of a plurality of the second user's social network accounts the first user may connect with;

receive a selection of a plurality of the indicated second user's social network accounts to connect with; and receive data indicative of more than one generated connection between the selected plurality of the first user's social network accounts and the selected plurality of the second user's social network accounts.

9. The first mobile wireless device of claim 8, wherein the first invitation is accessible through the second wireless mobile device.

10. The first mobile wireless device of claim 8, wherein the software is further configured to discover a list of nearby user accounts through the use of a near field or Bluetooth communication protocol, wherein the list of nearby user accounts includes the second user account.

11. The first mobile wireless device of claim 8, wherein the software is further configured to discover a list of nearby user accounts through the use of geolocation information, wherein the list of nearby user accounts includes the second user account.

12. The first mobile wireless device of claim 11, wherein the user interface is further configured to display, in a spatial relationship, a plurality of user icons corresponding to the nearby user accounts, wherein the spatial relationship is based at least in part upon a proximity of each of the nearby user accounts to the first user.

13. The first mobile wireless device of claim 8, wherein the first invitation further comprises personal contact information including at least one of:

a telephone number of the first user, an email address of the first user, and a mailing address of the first user.

14. A non-transitory computer readable medium comprising code that, when executed, performs a method for unified synchronization of relationship connections across a plurality of social networks, the method comprising:

logging in a first user to a first user account through a first wireless mobile device controlled by the first user, wherein the first user account comprises a logical connection to a plurality of the first user's social network accounts;

discovering, by the first wireless mobile device, a second wireless mobile device controlled by a second user, wherein a second user account is associated with the second user;

selecting more than one of the first user's social network accounts via input from the first user to the first wireless mobile device;

upon receiving the input from the first user to the first wireless mobile device, causing a generation of a first invitation, wherein the first invitation comprises a connection invitation for the second user to connect to the selected social network accounts of the first user;

sending the first invitation to the second user account;

displaying a second invitation to connect from the second user's account on the first wireless mobile device in response to the first invitation having been accepted, wherein the displaying comprises indicating which of a plurality of the second user's social network accounts the first user may connect with;

selecting a plurality of the indicated second user's social network accounts to connect with via input from the first user to the first wireless mobile device; and receiving data indicative of more than one generated connection between the selected plurality of the first user's social network accounts and the selected plurality of the second user's social network accounts.

* * * * *